United States Patent [19]

Chapelsky

[11] Patent Number: 4,572,097
[45] Date of Patent: Feb. 25, 1986

[54] OIL LEVEL DETECTOR

[75] Inventor: Orest Chapelsky, Ann Arbor, Mich.

[73] Assignees: Jere R. Lansinger, Bloomfield Hills; Bohdan W. Fedorowycz, Livonia, both of Mich.

[21] Appl. No.: 541,894

[22] Filed: Oct. 14, 1983

[51] Int. Cl.³ .................. G01F 23/04; G01F 23/00; H01H 35/38; G08B 21/00
[52] U.S. Cl. .................. 116/227; 200/82 R; 200/82 D; 340/59; 340/60; 340/612
[58] Field of Search .................. 116/227, 226, 272; 33/126.7 R, 126.7 A; 73/303; 340/59, 60, 612, 614; 200/61.04, 82 R, 82 D, 83 Q; 138/103, 174, DIG. 8; 137/557, 558

[56] References Cited

U.S. PATENT DOCUMENTS

| 1,957,106 | 5/1934 | Kerzak | 340/60 |
|---|---|---|---|
| 2,264,024 | 11/1941 | Glashan | 200/82 D |
| 2,588,761 | 3/1952 | Raby | 340/59 |
| 2,704,556 | 3/1955 | Blish | 138/DIG. 8 |
| 2,998,028 | 8/1961 | Rohde | 138/118 |
| 3,013,579 | 12/1961 | Gilliam | 137/527 |
| 3,022,497 | 2/1962 | Tyner | 137/558 |
| 3,316,647 | 5/1967 | Swallert | 33/126.7 R |
| 4,055,898 | 11/1977 | Braun et al. | 33/126.7 R |
| 4,079,750 | 3/1978 | Ludwig | 138/42 |
| 4,219,710 | 8/1980 | Booth | 200/83 Q |

Primary Examiner—Charles Frankfort
Assistant Examiner—W. Morris Worth
Attorney, Agent, or Firm—Gifford, VanOphem, Sheridan & Sprinkle

[57] ABSTRACT

An oil level sensing device is provided for use in conjunction with an engine having a cycling vacuum source, an oil reservoir and a dip stick guide tube extending upwardly from the oil reservoir. The device comprises a housing defining a chamber while a valve plate having a port divides the housing chamber into upper and lower chambers. An elongated fluid conduit is secured to the housing and open to the lower chamber while the other end of the conduit is insertable into the dip stick guide tube and the end of conduit is positioned at a predetermined level with respect to the oil reservoir. A piston is slidably mounted within the upper chamber and is movable between an upper and a lower position. A spring urges the piston towards its lower position during low vacuum mode while the engine vacuum source, connected to the upper chamber, urges the piston towards its upper position during high vacuum mode. A float valve is contained within the lower chamber for closing the port in the valve plate only when the oil within the reservoir is above a predetermined level thus limiting the upward movement of the piston. When the oil is below a predetermined level, there is insufficient oil drawn into the float chamber to close the float valve and the piston is thereby free to travel to the top of the upper chamber. The piston actuates an electrical switch when in its uppermost position which, in turn, actuates an alarm.

11 Claims, 6 Drawing Figures

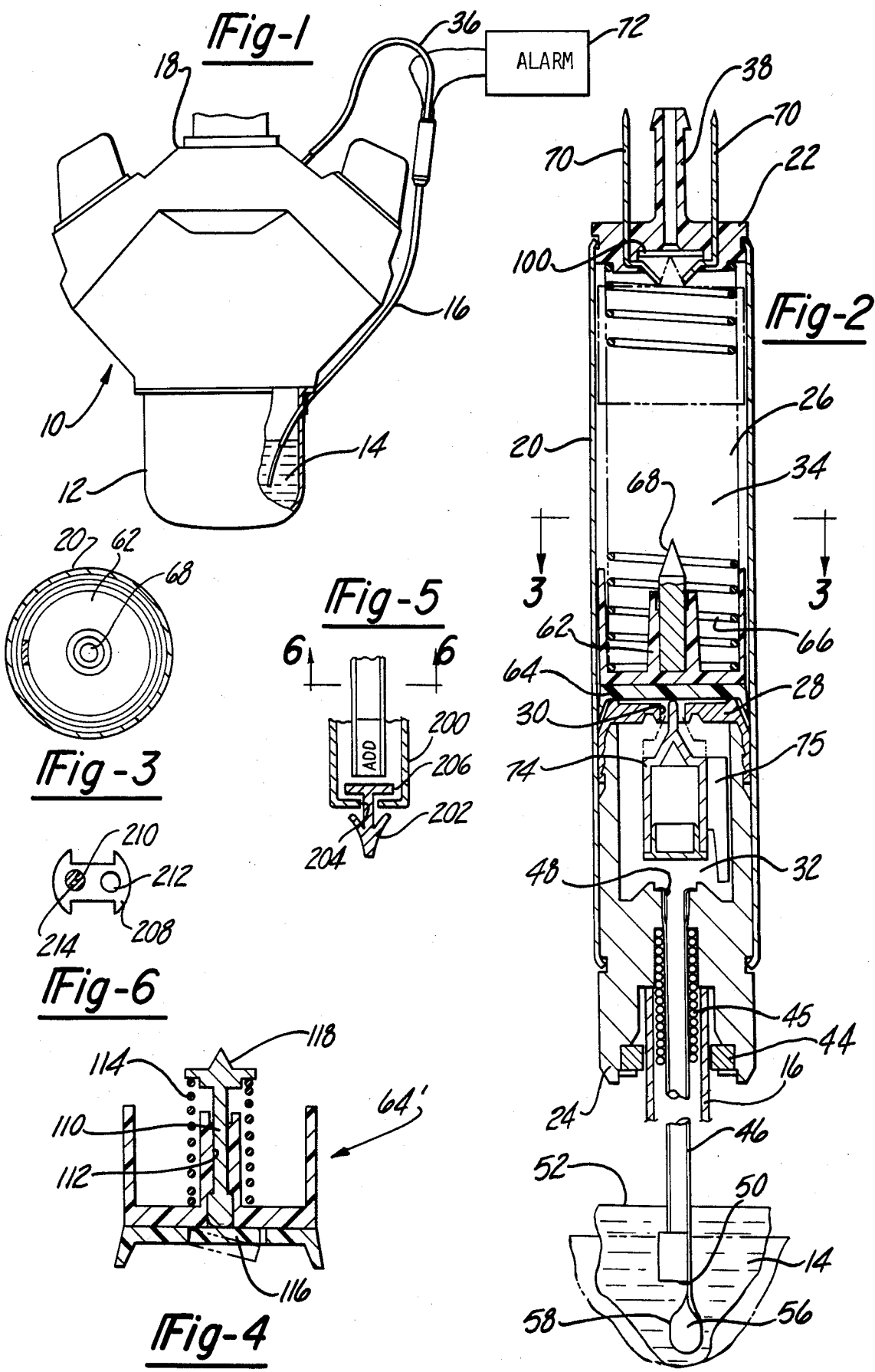

4,572,097

OIL LEVEL DETECTOR

BACKGROUND OF THE INVENTION

I. Field of the Invention

The present invention relates generally to a device for automatically detecting a low level oil condition for an engine.

II. Description of the Prior Art

Internal combustion engines of the type employed in vehicles include a crank case which forms an oil reservoir in which the engine oil is contained. The oil level must be maintained at a predetermined level within the reservoir in order to insure sufficient oil feed to the lubrication system and avoid excessive mechanical wear to the engine resulting from inadequate lubrication.

In order to check the oil level within the crank case, many engines have a dip stick guide tube which is open at its lower end to the crank case and extends upwardly along a side of the engine. A flexible dip stick is inserted into this guide tube so that the lower end of the dip stick is positioned within the oil reservoir. Thus, upon removal of the dip stick from the guide tube, the oil level within the crank case can be determined by examining the dip stick.

One disadvantage of using the dip stick to check the oil level within the crank case is that the level can only be periodically checked by the operator and cannot be checked at all during the operation of the engine. Self Service gas stations are becoming the norm and checking the oil level by removing the dip stick is an inconvenient and messy operation and thus avoided by many persons.

Many engines, such as those used on automotive vehicles, provide a warning indicator for the driver when the oil pressure falls below a predetermined amount. The oil pressure, however, can remain high despite a low oil level condition for the engine. Consequently, even though the oil pressure for the engine is adequate, the oil level is not and such a condition can result in rapid deterioration of the oil pressure which very quickly results in damage and/or erosion of the engine components and very costly repairs.

SUMMARY OF THE PRESENT INVENTION

The present invention provides an oil level sensing device which overcomes the above-mentioned disadvantages.

In brief, the device of the present invention comprises an elongated housing defining an elongated interior chamber. A first cap covers the upper end of the chamber while, similarly, a second cap covers the lower end of the chamber.

An elongated fluid conduit is secured at one end to the second cap and open to the housing chamber. The fluid conduit is insertable into the dip stick guide tube of the engine so that the other end of the fluid conduit is submerged below the oil level of the crank case when the engine oil level is adequate.

A valve plate having a port is secured within the housing chamber and divides the housing chamber into a lower float chamber and an upper piston chamber. A vacuum source from the engine, such as the engine manifold, is fluidly connected to the upper air chamber while the lower float chamber is open to the engine crank case via the tube.

A piston is longitudinally slidably mounted within the piston chamber and is urged against the valve plate by a spring. Thus, as the engine vacuum source produces a vacuum in the air chamber, the vacuum urges the piston against the force of the compression or tension spring and towards the first or upper cap containing alarm switch contacts.

A float valve is contained within the float chamber and movable between an open position, in which the piston and float chambers are fluidly connected by the port, and a closed position in which the valve member closes the valve port. In the event that the lower end of the fluid conduit is submerged in the oil in the crank case, the upward movement of the piston caused by the vacuum within the piston chamber inducts oil up through the conduit, into the float chamber and moves the float valve to the closed position. In doing so, the further upward movement of the piston creates a reduced pressure zone between the valve plate and the piston and maintains the piston at a midpoint within the piston chamber.

Conversely, in the event that the oil level in the crank case is below the lower end of the tube, the upward movement of the piston in the piston chamber inducts primarily air at crank case pressure, which is nearly atmospheric pressure, into the float chamber. Consequently, the float remains in its open position and a high vacuum in the air chamber will move the piston against the first end cap and actuate a switch to provide a warning signal to the engine operator.

Preferably, the present invention includes a vacuum delay valve and/or a guard shield at the end of the tube to eliminate erroneous warnings due to transient oil slosh in the crank case.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 1 is a diagrammatic view illustrating the installation of the preferred embodiment of the present invention;

FIG. 2 is a longitudinal sectional view of the preferred embodiment of the invention;

FIG. 3 is a cross sectional view taken substantially along line 3—3 in FIG. 2;

FIG. 4 is a side view showing an alternate construction of the piston.

FIG. 5 is a fragmentary sectional view showing a further preferred embodiment of my invention; and FIG. 6 is a view taken along line 6—6 with FIG. 5.

DETAILED DESCRIPTION OF A PREFERRED EMBODIMENT OF THE PRESENT INVENTION

With reference first to FIG. 1, a preferred embodiment of the oil level sensing device of the present invention is thereshown in conjunction with an internal combustion engine 10. The engine 10 is conventional in construction and includes a crank case 12 which forms an interior oil reservoir 14. A dip stick guide tube 16 is open at its lower end to the oil reservoir 14 and extends upwardly from the crank case 12 and along one side of the engine 10. The engine 10 also includes an intake manifold 18 which is conventional in construction.

With reference now to FIGS. 1 and 2, the device of the present invention comprises an elongated tubular and cylindrical housing 20 which is closed at its upper end by upper end cap 22 and at its lower end by lower end cap 24. An elongated cylindrical chamber 26 is thus formed within the housing 20 in between the end caps 22 and 24.

With reference now particularly to FIG. 2, a valve plate 28 having a central port 30 is secured at a midpoint within the housing 20 and divides the housing chamber 26 into a lower float chamber 32 and an upper piston chamber 34 with the port 30 fluidly connecting the chambers 32 and 34 together. The upper end of the piston chamber 34 is fluidly connected to a vacuum source, such as the engine intake manifold 18 (FIG. 1) by a vacuum line 36 (FIG. 1) attached to a fluid connector 38 formed in the upper end cap 22.

With reference now to FIG. 2, the lower end cap 24 includes a fluid seal 44 carried by the lower end cap 24 and sealingly engages the outer periphery of the dip stick guide tube 16.

An elongated flexible conduit 46 is attached to the lower end cap 24 so that the upper end 48 of the conduit 46 is open to the float chamber 32. The tube 46 is dimensioned to fit through the dip stick guide tube 16 so that a lower end 50 of the tube 46 is positioned below the oil level 52 of the reservoir 14 when the oil level in the reservoir 14 is adequate. A Helical wire cable 45 is preferably wrapped around at least a portion of the tube 46 to protect the tube 46 and still permit it to flex.

With reference still to FIG. 2, a dip stick 56 is preferably secured to the lower end of the tube 46 so that a lower end 58 of the dip stick 56 extends into the oil reservoir 14. The dip stick 56 allows the oil level to be manually checked.

With reference now particularly to FIG. 2, a piston 62 is axially slidably mounted within the piston chamber 34 and sealingly engages the interior walls of the housing 20 by a fluid seal 64 carried at its lower end. A compression spring 66 is sandwiched in between the piston 62 and the upper end cap 22 which urges the piston 62 away from the upper end cap 22 and toward the valve plate 28. In addition, an electrically conductive member 68 carried by the piston 62 engages a pair of electrical contacts 70 mounted to the upper end cap 22 when the piston 62 is in its uppermost position as shown in phantom line in FIG. 2. These electrical contacts 70 are, in turn, electrically connected to an alarm circuit 72 (FIG. 1).

Still referring to FIG. 2, a float valve 74 having guide legs 75 is positioned within the float chamber 32 and movable between an upper position, shown in phantom line, and a lower position, shown in solid line. In its upper position, a conical protrusion on the float valve 74 engages and fluidly closes the valve port 30 thus fluidly disconnecting the chambers 32 and 34 from each other. Conversely, in its lower position, air can freely flow from the float chamber 32, through the port 30 and into the upper working chamber 34.

In operation, the dip stick for the engine 10 is removed and replaced with the device of the present invention and, assuming that the oil level 52 in the reservoir 14 is adequate, the lower end 50 of the conduit 46 is positioned below the oil level 52. After the engine 10 is started, the piston chamber 34 is evacuated through the vacuum line 36 and intake manifold 18. The evacuation of the piston chamber 34 thus moves the piston 62 upwardly against the force of the compression spring 66 and to an intermediate point in the piston chamber 34. Simultaneously, the upward movement of the piston 62 inducts oil from the reservoir 14 through the conduit 46 and into the float chamber 32.

Alternatively, the lower end of the device of the present invention can be positioned in the reservoir 14 by means separate from the dipstick guide tube.

When the piston 62 reaches an intermediate point of the piston chamber 34, the oil within the float chamber 32 is sufficient to move the float 74 to its upper position thus closing the valve port 30. In doing so, the further upward movement of the piston 62 creates a vacuum between the valve plate 28 and the lower end of the piston 62 which limits the further upward movement of the piston 62 to a position below the topmost position shown in phantom line in FIG. 2. Thus, when the oil level 52 is above the lower end 50 of the conduit 46, the electrically conductive member 68 carried by the piston 62 does not engage the electrical contacts 70.

Conversely, assuming that the oil level 52 in the reservoir 14 is below the lower end 50 of the conduit 46, the upward movement of the piston 62 inducts air, rather than oil, into the float chamber 32 so that the float 74 remains in its lower position. When a sufficiently high vacuum is applied to the upper chamber, as would occur during engine deceleration, the piston 62 moves to its uppermost position as shown in phantom in FIG. 2 whereupon the electrically conductive member 68 engages the electrical contacts 70 and activates the alarm 72. In this event, the upward movement of the piston 62 is generally unrestrained since air at substantially atmospheric pressure is inducted through the tube 46, float chamber 32, through the port 30 and into the piston chamber 34 thereby allowing differential pressure to move the piston 62 freely to top of piston chamber to actuate alarm contacts 70.

Since the activation of the alarm 72 is dependent upon the cyclical vacuum present in the intake manifold 18, the activation of the alarm 72 during a low oil level condition continues dynamically while the engine is in operation. The resulting intermittent activation of the alarm 72 warns the operator of the engine of the low oil level condition.

With reference to FIG. 2, a vacuum delay valve 100 is preferably positioned between the conduit 38 and the upper chamber 34. The valve 100 prevents activation of the alarm 72 due to rapid increases in the vacuum in the vacuum line 36 coupled with a temporary low oil level at the tube end as could be caused by sloshing of the oil in the crank case. During a continued or long term low level oil condition, however, the valve 100 leaks vacuum to the chamber 34 through the interface of valve 100 and upper end cap 22 in the desired fashion. The valve 100 is free to open and allow rapid lowering of the piston upon vacuum decreasing.

With reference now to FIG. 4, an alternative construction for the piston 64' is thereshown which includes a plunger 110 slidably mounted in an axial piston bore 112. The plunger 110 is urged towards its extended position by a compression spring 114 while the lower end of the plunger 110 abuts against a flapper valve 116.

In operation and assuming a low level oil condition, the piston 64' moves upwardly in the expected fashion until the nose 118 of the plunger 110 abuts against the contacts 70 and completes the electrical circuit. The continued upward movement of the piston 64' momentarily vents the piston seal and the piston is caused to momentarily drop causing opening of the electrical contacts. A moment later the plunger 110 returns to its normal position relative to the piston and the flapper valve is closed allowing the piston and contacts to cycle again. This action provides simple and inexpensive means to provide a blinking warning signal of a low level oil condition to the operator.

Although the present invention has been described as using a cyclical vacuum source, i.e., the intake manifold vacuum, to urge the piston upwardly, it will be understood that other means, such as an electric solenoid, or motor, or any vacuum pump for example, can alternatively be used to move the piston cyclically. Also a diaphragm could alternatively be used instead of a piston.

With reference now to FIG. 5, a still further improvement of the present invention is thereshown in which a valve member 202 having an enlarged diameter portion 206 is mounted through a hole 204 in a cylindrical container 200. The container 200 which may be a part of the guide tube 16 forms a chamber which encloses the lower end of the conduit 46.

Assuming a normal oil level condition, oil fills the container and is inducted through the conduit 46 and into the chamber 32 as has been previously described. In addition, however, in the event of oil sloshing in the crankcase so that the oil falls below the normal level, the valve 202 moves to its closed position and traps oil in the container 200 to prevent a false low oil level indication. In the event of a prolonged low oil level condition, oil leaks from the container 200 past the valve member 202 and produces the desired low oil level indication.

With reference now to FIG. 6, an alternate form of the conduit is thereshown in which the body 208 is formed from an extruded or molded material, such as plastic, and reinforced with a wire 214 positioned through a hole 210. A further hole 212 provides fluid communication from the crankcase and to the chamber 32.

From the foregoing, it can be seen that the device of the present invention provides a simple and yet wholly effective device for detecting a low oil level condition of the engine. The device of the present invention can be easily installed in the engine in place of the conventional dip stick. Furthermore, the oil level for the engine can still be readily manually checked by use of the dip stick 56 contained on the conduit 46. In addition, the use of the intake manifold vacuum or other actuation means as the power source for moving the piston 62 is both simple, inexpensive and wholly effective in operation.

A still further advantage of the present invention is that, since the oil level in the crank case is somewhat higher when the engine is off than during operation of the engine, false alarm signals are avoided even when the car is parked on a steep grade upon engine start up.

Although the present invention has been described for checking the oil level in the engine crank case, it will be understood that it can be used with other fluid systems without deviation from the spirit or scope of the present invention.

Having described my invention, however, many modifications thereto will become apparent to those skilled in the art to which it pertains without deviation from the spirit of the invention as defined by the scope of the appended claims.

I claim:

1. For use with a liquid system having a reservoir, a device for detecting when a liquid in the reservoir falls below a predetermined level comprising:
   a housing defining a chamber,
   means for fluidly connecting said housing chamber to said reservoir,
   a plate having a port, said plate dividing said housing chamber into an upper elongated chamber and lower chamber,
   a piston slidably mounted in said upper chamber and movable between a first position in which said piston is adjacent said plate and a second position in which said piston is adjacent an end of said upper chamber spaced from said plate,
   means for urging said piston towards said first position,
   means for continuously cyclically urging said piston towards said second position, said cyclical urging means comprising a cyclical vacuum source continuously fluidly connected to said end of said upper chamber,
   means for indicating when said piston is at said second position, and
   means for closing said port when said liquid is at or above said predetermined level so that with said port closed, travel of said piston toward said second position creates a partial vacuum in said lower chamber which prevents said piston from reaching said second position and so that, when said liquid is below said predetermined level, said port remains open to prevent the formation of a partial vacuum in said lower chamber.

2. The device as defined in claim 1 wherein said closing means comprises valve means contained within said lower chamber and an elongated tube open at each end, a first end of said tube secured to said housing and open to said lower chamber, said tube insertable into said reservoir so that a second end of said tube is positioned at said predetermined level.

3. The device as defined in claim 2 wherein said valve means comprises a liquid float which closes said port when said liquid is above said predetermined level.

4. The device as defined in claim 1 wherein said means for urging said piston comprises a spring contained within said upper chamber and compressed between said piston and one end of said housing.

5. The device as defined in claim 1 wherein said indicating means comprises an electrical switch and means carried by said piston for actuating said switch when said piston is in said second position.

6. The device as defined in claim 5 wherein said switch comprises a pair of spaced electrical contacs secured to said housing within said upper chamber at said end of the upper chamber, wherein said means carried by said piston comprises an electrically conductive member which engages said contacts when said piston is in said second position.

7. The device as defined in claim 2 and comprising a dip stick for manual reading of the level of the reservoir secured to said second end of said tube.

8. The device as defined in claim 1 and comprising a vacuum delay valve fluidly connected in series between said cyclical vacuum source and said upper chamber.

9. The device as defined in claim 2 and comprising means for maintaining fluid connection between said lower chamber and said reservoir whereby said lower chamber remains in communication with said liquid during a mometary drop of the liquid below said predetermined level.

10. The device as defined in claim 9 wherein said maintaining means comprises a container enclosing the lower end of the tube, said container secured to said tube, and a leak valve open to said container.

11. The device as defined in claim 2 wherein said tube comprises an extruded plastic section having hollow conduit portion and containing a structural wire.

* * * * *